United States Patent [19]

Kondo

[11] Patent Number: 4,778,044
[45] Date of Patent: Oct. 18, 1988

[54] MATERIAL MAGAZINE FOR A METAL WORKING MACHINE

[75] Inventor: Mituo Kondo, Kawanishi, Japan
[73] Assignee: Daito Seiki Company, Ltd., Osaka, Japan
[21] Appl. No.: 84,624
[22] Filed: Aug. 11, 1987

[30] Foreign Application Priority Data

Aug. 11, 1986 [JP] Japan .................................. 61-188217

[51] Int. Cl.$^4$ .................................................. B65G 47/53
[52] U.S. Cl. ............................ 198/464.2; 198/469.1;
 198/572; 198/598; 198/699.1; 198/456;
 198/734; 198/817; 83/279; 83/280; 83/282;
 83/436; 414/745
[58] Field of Search .............. 198/464.2, 463.2, 469.1,
 198/572, 803.2, 803.14, 795, 817, 688.1, 697,
 699.1, 457, 956, 458, 572, 597, 598, 604, 605,
 624, 734; 83/865, 874, 63, 66, 79, 112, 155,
 155.1, 158, 209, 279, 280, 282, 364, 732, 419,
 423, 436; 414/745, 747; 72/27, 201, 405, 422

[56] References Cited

U.S. PATENT DOCUMENTS

| | | | |
|---|---|---|---|
| 3,007,500 | 11/1961 | Halicki et al. | 83/280 X |
| 3,193,084 | 7/1965 | Bauer et al. | 414/745 X |
| 3,244,047 | 4/1966 | Daniluk | 83/280 X |
| 3,279,600 | 10/1966 | Lawson | 198/443 X |
| 3,767,033 | 10/1973 | Yamauchi et al. | 198/817 |
| 3,880,273 | 4/1975 | Kaplan | 198/444 |
| 4,286,638 | 9/1981 | Connolly et al. | 414/745 X |
| 4,485,705 | 12/1984 | Moilanen | 83/158 X |
| 4,737,068 | 4/1988 | Mochizuki | 414/745 |

Primary Examiner—Robert J. Spar
Assistant Examiner—Lyle Kimms
Attorney, Agent, or Firm—Koda and Androlia

[57] ABSTRACT

A material magazine for automatically feeding material such as long steel bars to a metal working machine including at least two parallel chain-conveyers, material guide rollers, a material arrival detecting means, and a material feed roller. The chain-conveyers are driven by a hydraulic motor which runs with a predetermined rotating force continuously produced when overloaded and have material push rollers with the axes vertically upward of the carrying faces of the chain-conveyers. The material push rollers are not only spaced in the direction of the conveyers but also arranged to form straight rows in the direction perpendicular to the conveyers, forming material holding spaces between them in the direction perpendicular to the conveyers. The material guide rollers are provided at or near one end of each of the conveyers with the axes kept vertical so that the material guide rollers may be arranged straight and parallel to the rows of the material push rollers. A material arrival detecting roller and material feed roller are provided along the material guide rollers. The material arrival detecting roller includes a vertical roller with the axis not rigidly fixed but slightly slidable and mechanically interlocked with a switch. The material feed roller feeds the material having arrived at the material guide rollers toward an index vise of the sawing machine along the length direction of the material.

2 Claims, 4 Drawing Sheets

MATERIAL MAGAZINE FOR A METAL WORKING MACHINE

BACKGROUND OF THE INVENTION

The present invention relates to a material magazine for automatically feeding materials such as long steel bars to a metal working machine.

Advancement of computerized control systems has come to enable the metal working machines (including sawing machines) to work automatically without an operator, for example, in cutting a material such as a long cylindrical steel bar into pieces as desired in size and number. The automatization of metal working machines is, as a matter of course, accompanied by a need for an apparatus to automatically feed materials to an objective metal working machine.

A typically conventional material magazine for a metal working machine such as a sawing machine consists of a horizontal roller-conveyor for transferring a material in the length direction toward a metal working machine and of a material loading bed equipped with material pushing flukes. The bed, which is directed to a flank of the conveyor, supplies a thereon placed material onto the horizontal roller-conveyor by pushing the material with the flukes in the lateral direction.

The automatization itself of such a material magazine may easily be attained by incorporating the operation sequence of the magazine purposefully into the sequence control program of a automatized metal working machine. However, the above-mentioned material magazine has a disadvantage that, if the material shows a warp, it is frequently transferred improperly owing to the warp of the material, so that the head of the material may not be inserted in the metal working machine. Such an irregular transfer is prone to take place especially in case of the material being a long bar. The above disadvantage remains a major obstruction in making the material magazine automatically operative.

OBJECTS AND SUMMARY OF THE INVENTION

The present invention aims at solving the above mentioned disadvantage accompanying the conventional material magazine for a metal working machine such as a sawing machine, and makes it an object to provide a material magazine improved so as to enable the materials to be properly and reliably fed to a metal working machine.

Another object of the present invention is to constitute such an improved material magazine so that the same may be automatically operative in conjunction with the automatic operation of an objective metal working machine.

The present invention is summarized in the following with a sawing machine exemplified as a metal working machine to which the present invention is to be associated.

To achieve the above objects a material magazine according to the present invention comprises at least two parallel chain-conveyors aligned in perpendicular to the material feeding direction of the sawing machine. The chain-conveyors are driven by such a mechanism as a hydraulic motor capable of racing with a predetermined rotating force kept produced when overloaded. The chain-conveyors have their respective chains provided with material push rollers with their axes kept vertically upward of the carrying faces of the chain-conveyors. The material push rollers are not only spaced purposefully in the direction of the conveyors, but also arranged so as to form straight rows in the direction perpendicular to the conveyors, thereby providing material holding spaces therebetween extending in the direction perpendicular to the conveyors over all of the same.

At or near one end of each of the conveyors there is provided with a material guide roller with its axis kept vertical, so that such material guide rollers belonging to all the different conveyors may form a straight row in parallel with the rows formed by the above material push rollers. In line with those material guide rollers there are further provided a material arrival detecting roller and a material feed roller. The material arrival detecting roller, which is to detect the arrival of a material at the material guide rollers, is made up of a vertical roller (similar to the material guide rollers) with the axis not rigidly fixed but made slightly slidable and mechanically interlocked with a switch. The material feed roller, which is motor-driven and operated by the above switch, is to feed the material having arrived at the material guide rollers toward an index vise of the sawing machine along the length direction of the material.

Since the chain-conveyors are driven, as is previously described, by a mechanism which races with a rotating force kept produced when overloaded, the material is fed with its trunk squeezed between the row of the material push rollers and that of the material guide rollers, so that the material, even if warped slightly, may be properly fed toward the metal working machine.

BRIEF DESCRIPTION OF THE DRAWINGS

In the following the present invention is described in detail on reference to the drawings illustrating an embodiment of the invention. Of the drawings.

DETAILED DESCRIPTION OF THE INVENTION

Figure 1:
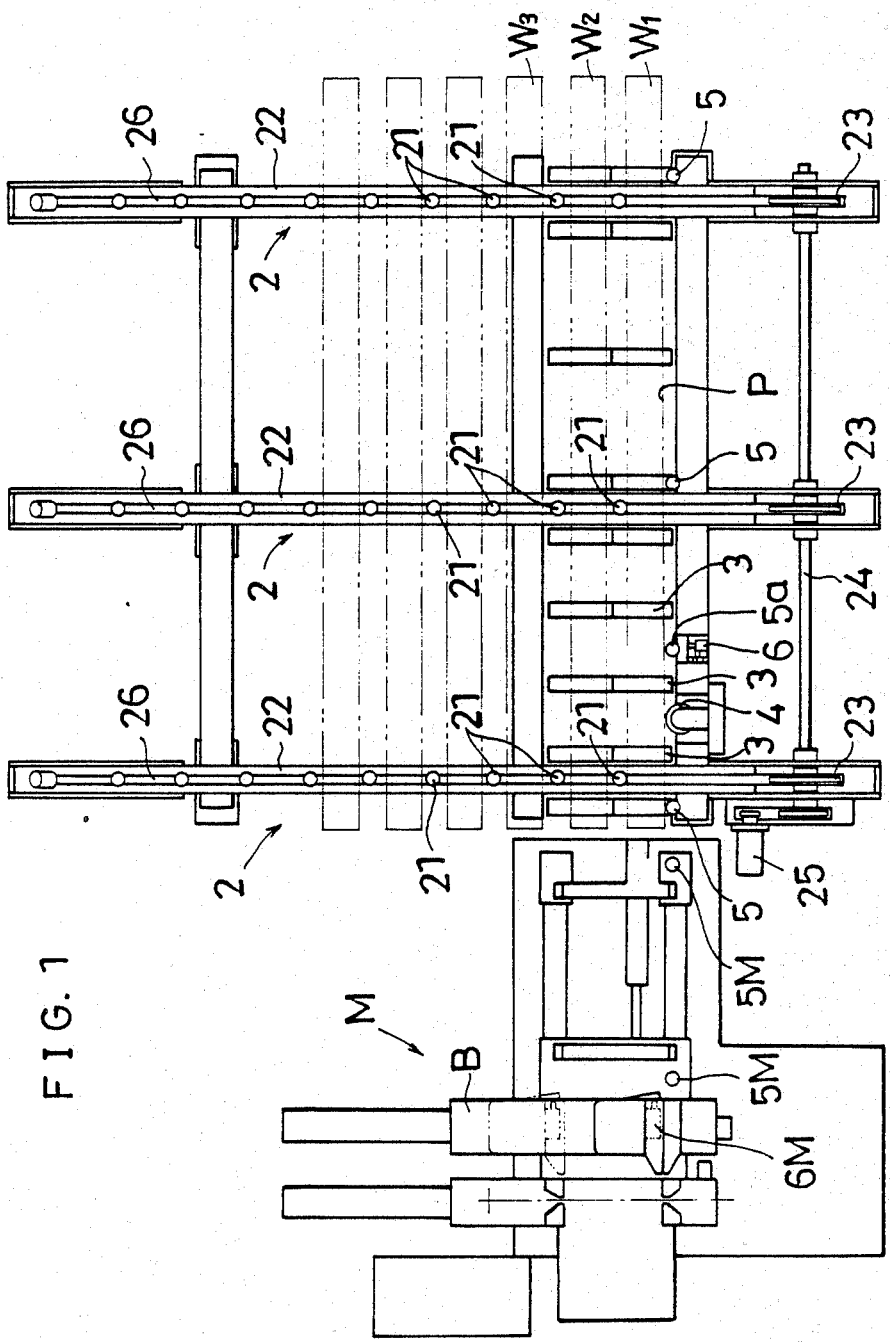
FIG. 1 shows a plane view illustrating an embodiment of the present invention, as disposed in relation to an objective sawing machine to be fed with materials by the embodiment.
Figure 2:
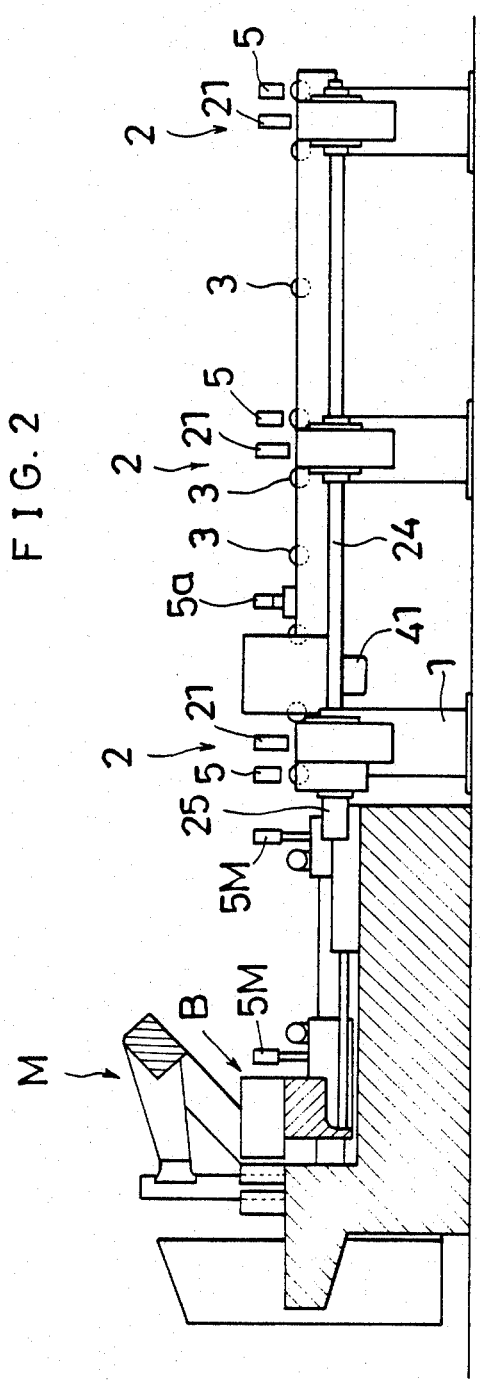
FIG. 2 shows a side view of the embodiment and the sawing machine shown in FIG. 1.
Figure 3:
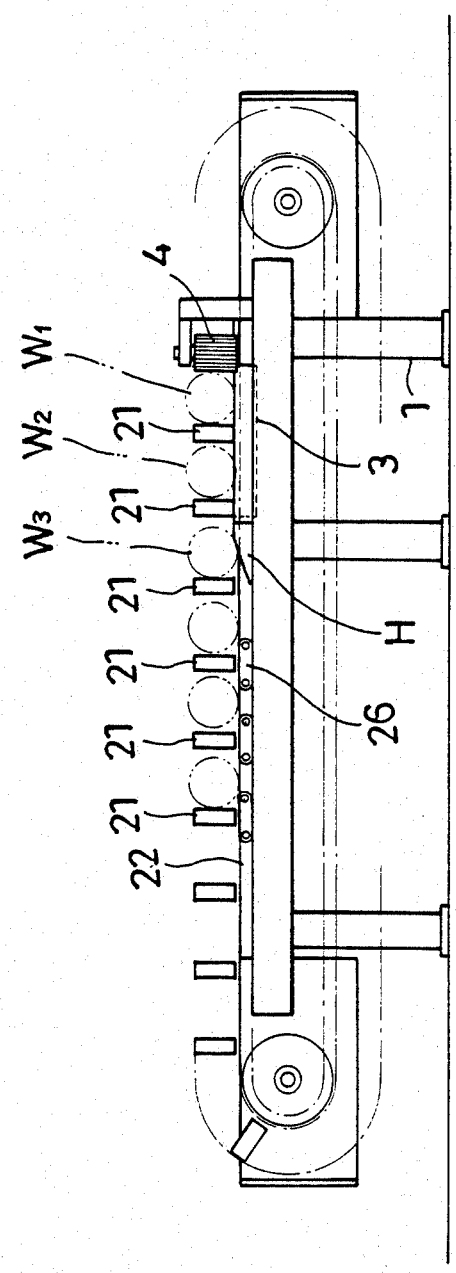
FIG. 3 shows a front view of the embodiment shown in FIG. 1.

Referring to FIGS. 1, 2 and 3, an embodiment of the present invention has its main part constituted of three chain-conveyor 2 arranged in parallel with one another and directed, as a whole, in parallel with the clamping direction of an index vise B of a sawing machine M. The chain-conveyors 2 have their respective chains 26 provided with material push rollers 21 with their axes kept vertically upward of material carrying faces 22 of the chain-conveyors 2. The material push rollers 21 are not only equally spaced in the direction of all the conveyors 2, but also arranged so as to form straight rows in the direction perpendicular to the conveyors 2. Such rows provide between two adjacent ones material holding spaces (in which supposed materials Wi (i=1,2,3, ...) are depicted with 2-dotted chain lines). All the chain-conveyors 2 are driven by a chain driving motor 25 through a common driving shaft 24 and their respective sprockets 23. The chain driving motor 25 is, for instance, a hydraulic motor capable of racing with a predetermined rotating force kept generated when overloaded.

At the transfer termini of the conveyors there are provided material guide rollers 5 for receiving a material transferred thereto. The guide rollers 5 are arranged, with their axes kept vertical, in parallel with the rows formed by the material push rollers 21 of the chain-conveyors 2. Further, in line with the material guide rollers 5 are provided a material arrival detecting roller 5a and a material feeding roller 4. The material arrival detecting roller 5a has its axis kept slightly slidable in the direction of the conveyors 2 and is pressed by a spring against the material transfer direction of the conveyors 2. On the other hand the material feed roller 4 is driven by a motor 41 (FIG. 2) to be energized through a switch 6, which is operated by the switch operating roller 5a.

In addition to the above fundamental constitution, there are arranged, covering the bed width of the objective sawing machine M, a plurality of horizontal rollers 3 with the axes directed in parallel with the conveyors 2 and with their upper level kept slightly higher than the material carrying faces 22 of the chain-conveyors 2. Further, on the flanks of the material carrying faces 22 there are attached slope-edged elements H (FIG. 3, not shown in FIG. 1 to avoid the complexity of drawing) by which the materials having been transferred thereto are slid up onto the horizontal rollers 3.

In the above described constitution of the embodiment, materials to be cut by the sawing machine M are mounted in advance in the material holding spaces provided between two adjacent lateral rows formed by the material push rollers 21. With the chain driving motor 25 switched on, the materials start to be transferred perpendicularly to their length direction toward the material guide rollers 5 (and therefore, also toward the material arrival detecting roller 5a and the material feed roller 4). On arriving of the first one of the materials at the material guide rollers 5, the material arrival detecting roller 5a turns on the switch 6 to make the motor 41 (FIG. 2) rotate to drive the material feed roller 4. Then the material starts to be fed toward the index vise B of the sawing machine M, being guided also by material guide rollers 5M provided on the sawing machine M, until the head of the material comes in contact with a limit switch 6M fixed to the index vise B, which is normally kept open. With this limit switch 6M operated, the motor 41 is made to stop driving the material feed roller 4. Thereafter, the index vise B starts an indexing operation by moving, with its movable jaw opened, a predetermined distance to clamp and bring the material to a predetermined cutting position in accordance with a sequential program prepared for an automatic operation of the sawing machine M. After the index vise B completes clamping the material in the above mentioned indexing operation, the chain-conveyors 2 are made to slightly retrocede to release the material squeezing and then are stopped. Thus the material can be fed smoothly to the sawing machine.

In the above process of feeding materials by this embodiment, the most important feature of the present invention is that, while a material is being fed toward the index vise B of the sawing machine M by the material feed roller 4, the material is kept squeezed tightly between the material push rollers 21 and the material guide rollers 5, because the racing force of the chain driving motor 25 continues to urge the material push rollers 21 to thrust the material to the material guide rollers 5. According to the present invention, therefore, materials can be fed, even if slightly warped, properly to a sawing machine.

Figure 4:
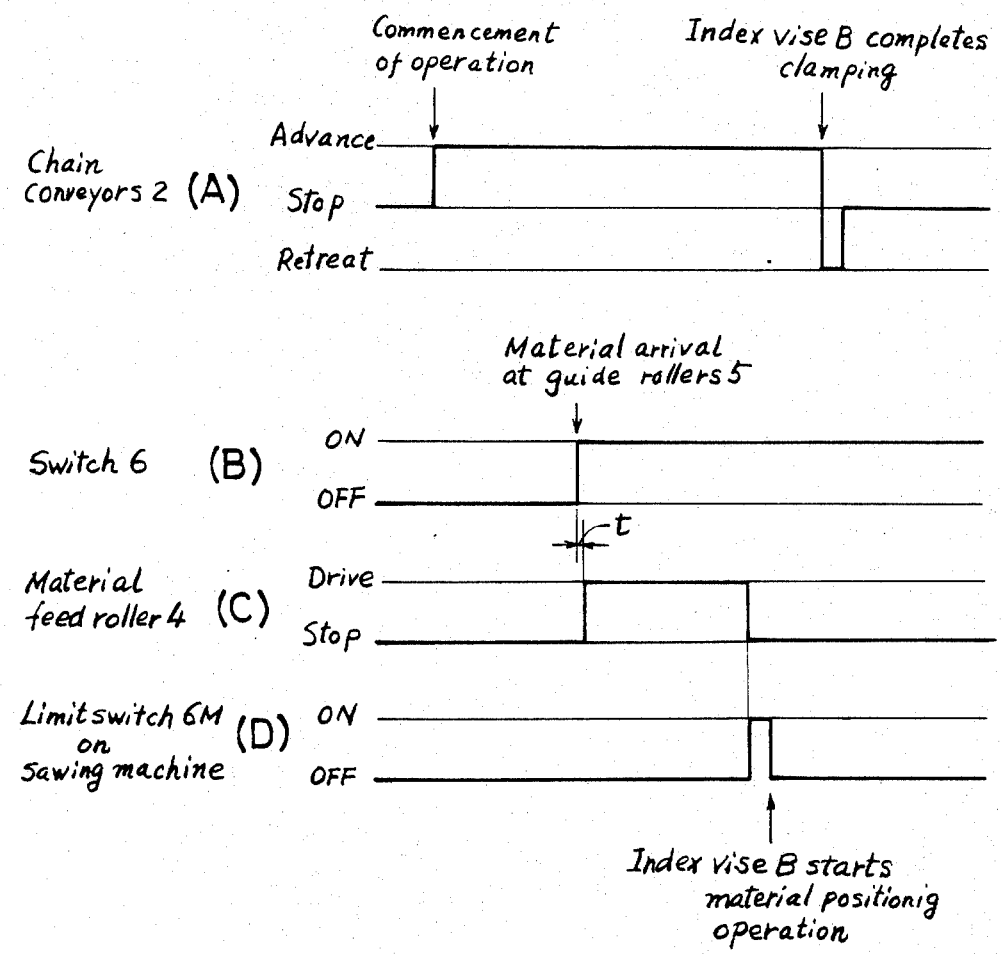
FIG. 4 shows time-charts illustrating the operation of the embodiment.

In the following the above described operation of the embodiment is summarized on reference to time-charts shown in FIG. 4.

According to an instruction to commence material supply, the chain driving motor 25 is switched on so as to advance the chain-conveyors 2 in the regular direction (chart A). On arriving of the first material at the material guide roller 5, the switch 6 is turned on (chart B), and then after a short time lag, the material feed roller 4 starts feeding the material (chart C) to the sawing machine M. When the material comes in contact with the limit switch 6M fixed to the index vise B of the sawing machine M, the limit switch 6M is operated (chart D) to stop the material feed roller 4 (chart C). After the feed roller 4 has stopped, the index vise B of the sawing machine M starts an indexing operation as mentioned previously in accordance with a sequential (not shown) program prepared for an automatic operation of the sawing machine. After the index vise B has completed clamping the material purposefully before material positioning, the chain-conveyors 2 are made to slightly retrocede and then are stopped (chart A). Then the material is fed toward the sawing machine.

As is understood from the above description, the present invention provides an improved material magazine for a metal working machine, which magazine is devised so as not only to supply materials such as long steel bars, even if warped slightly, securely to the objective metal working machine, but also to be operative in cooperation with an automatized metal working machine.

I claim:

1. A material magazine for automatically feeding material such as long steel bars to a metal working machine, said material magazine comprising:

at least two chain-conveyors positioned perpendicularly to a material feeding direction along which a material is to be fed to a metal working machine to which said material magazine is to be associated, said chain-conveyors being driven synchronously with each other or one another by a driving mechanism and having their respective chains provided with material push rollers with the push roller axes kept vertically upward of the material carrying faces of said chain-conveyors, said material push rollers being arranged in a pitch so as to form rows over all of said chain-conveyors in the direction orthogonal to the chain conveyors, said rows formed by said material push rollers providing therebetween material holding spaces stretching across said chain-conveyors;

material guide rollers fixed with their axes kept vertical and arranged in a straight line parallel with said rows formed by said material push rollers, said material guide rollers being for stopping the material transfer when the leading one of the material being transferred in said material holding spaces contacts said material guide rollers;

a material arrival detecting means for detecting said leading material having come in contact with said material guide rollers; and a material feed roller for feeding said material having come in contact with said material guide rollers along the length direction of said material such that said material is pushed onto said material guide rollers and said material feed roller by said material push rollers, said material feed roller being driven by a motor to be energized in accordance with the operation signal from said material arrival detecting means.

2. A material magazine as defined in claim 1, wherein one of said material guide rollers doubles as said material feed roller.

* * * * *